United States Patent [19]
Throne et al.

[11] Patent Number: 5,370,911
[45] Date of Patent: Dec. 6, 1994

[54] METHOD OF DEPOSITING AND FUSING CHARGED POLYMER PARTICLES ON CONTINUOUS FILAMENTS

[75] Inventors: James L. Throne, Akron, Ohio; Andrea L. Ogden, Blacksburg, Va.

[73] Assignee: The University of Akron, Akron, Ohio

[21] Appl. No.: 511,574

[22] Filed: Apr. 20, 1990

[51] Int. Cl.$^5$ .............................................. B05D 1/06
[52] U.S. Cl. ..................................... 427/469; 427/185; 427/516
[58] Field of Search ................... 427/185, 32, 469, 516

[56] References Cited
U.S. PATENT DOCUMENTS

| | | | |
|---|---|---|---|
| 3,873,389 | 3/1973 | Daniels | 156/181 |
| 3,919,437 | 11/1975 | Brown et al. | 427/13 |
| 4,072,795 | 2/1978 | Noonan | 428/379 |
| 4,084,019 | 4/1978 | Christ et al. | 427/32 |
| 4,839,199 | 6/1989 | de Vager | 118/308 X |
| 5,094,883 | 3/1992 | Muzzy et al. | 427/135 |

OTHER PUBLICATIONS

Throne, J. L. et al., "Electrostatic Dry Powder Pre-pregging of Carbon Fiber", 35th International SAMPE Symposium, Apr. 2-5, 1990, pp. 2086-2101.
Sampuran-Singh, et al., Journal of Electrostatics, vol. 4 (1978), pp. 325-334.
Cattanach, J. B., et al., Journal of Polymer Engineering, vol. 6, Nos. 1-4 (1986), pp. 345-362.
Muzzy, J., et al., 34th International SAMPLE Symposium, May 8-11, 1989, pp. 1940-1954.
Varughese, B., et al., "Combining LaRC-TPI Powder with Carbon Fiber by Electrostatic Fluidized Bed Coating." (Jouranl Citation to Come) (1989).
Hartness, T., et al., "Composite Developments from Fully Imidized PMR-15", 34th International SAMPLE Symposium, May 8-11, 1989.
Cross, J., "Electrostatic Powder Coating", Chemistry in Brittain, vol. 17, No. 1 (1981), pp. 24-26.
Kim, C., et al., "Development of Fiber Spreading Technique for Metal Matrix Composites," NRL Memorandum Report 5831, U.S. Naval Research Laboratories, 30 Dec. 1986 (Abstract).
GEMA, Specifications of ES Sprayers types 701, 702 and 705. Product bulletin, 13 sheets (26 pages), published by Ransburg-GEMA AG, St. Gallen, Switzerland, 1982.

Primary Examiner—Peter A. Nelson
Attorney, Agent, or Firm—Oldham, Oldham & Wilson Co.

[57] ABSTRACT

Process for making a tow pre-preg (or tow-preg) comprising long continuous fibers coated with a thermoplastic polymer. A spread tow of long continuous fibers, preferably carbon or glass, is grounded and coated with electrostatically charged particles. The fiber diameter is about 5-50 microns and the mean particle diameter is about 0.1-40 microns. A particle laden air stream is formed by aspirating fluidized polymer particles into a flowing air stream whose velocity exceeds the settling velocity of the particles. The particles in the flowing air stream are continuously electrostatically charged by means of an applied voltage of at least about 20 kV. The flowing air stream with electrostatically charged particles suspended therein is then contacted with the continuously moving grounded spread fiber tow. The particle laden air stream is flowing downwardly and the fiber tow moving horizontally at the time of contact. The fibers with thermoplastic particles clinging thereto are continuously heated to a temperature sufficient to cause fusion of the thermoplastic polymer. This results in long continuous fibers coated with the thermoplastic polymer. The resulting tow-preg, or tow of coated fibers, is useful in the preparation of structural composites in which the fibers service reinforcing fibers. The thermoplastic coating polymer is a high performance polymer, such as thermoplastic polyimide (TPI), where high performance and the structural composite is desired. Polymer coating weights may vary from about 20% to about 90% of the total tow-preg weight.

15 Claims, 2 Drawing Sheets

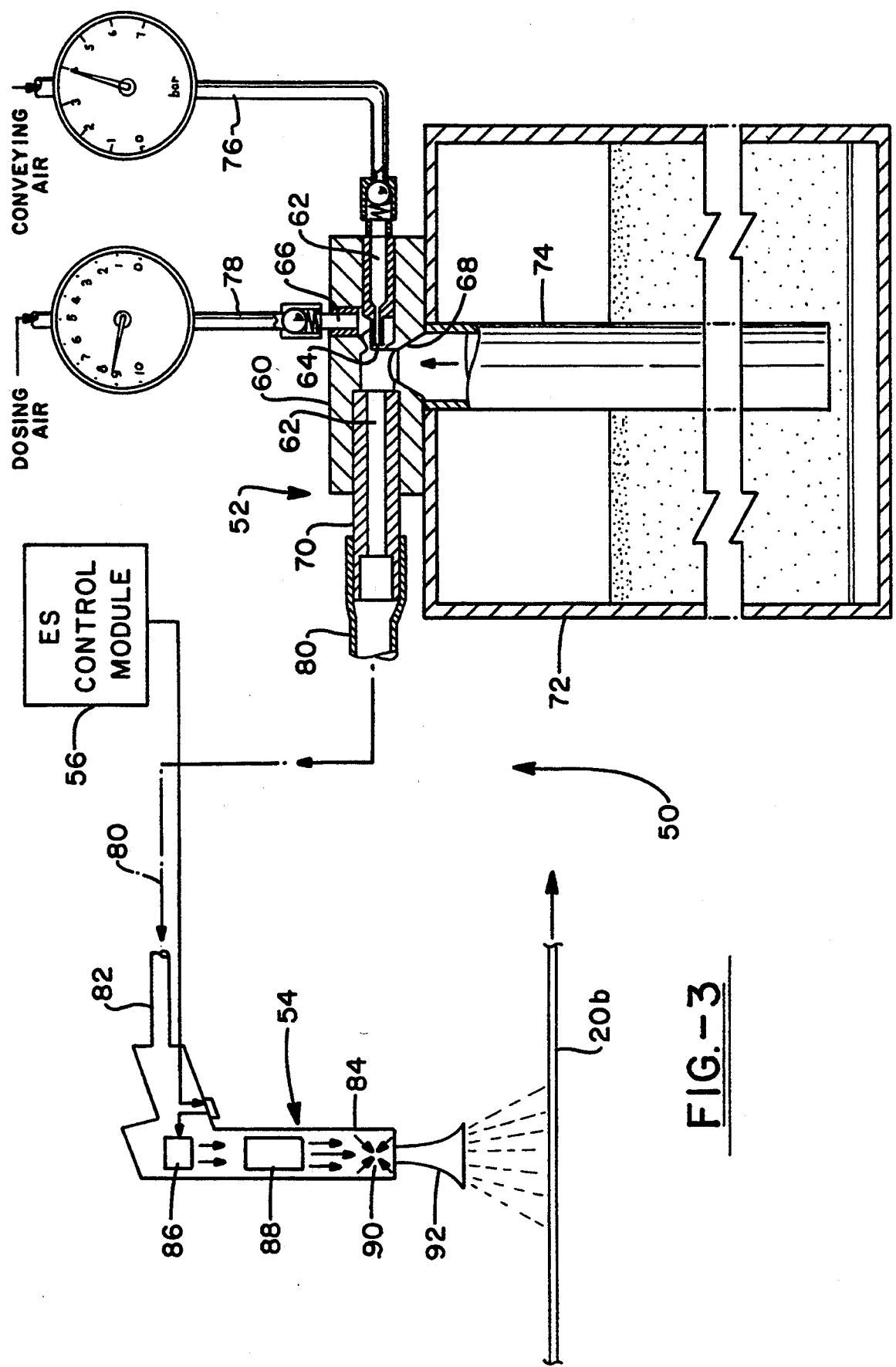

METHOD OF DEPOSITING AND FUSING CHARGED POLYMER PARTICLES ON CONTINUOUS FILAMENTS

GOVERNMENT RIGHTS

This invention was made with Government support under Contract Nos. NAG-1-779 and NAG-1-343. The Government has certain rights in this invention.

TECHNICAL FIELD

This invention relates to methods or processes for coating of continuous fibers. More particularly, this invention relates to electrostatic coating processes for producing coated fibers or filaments which are useful in making high-performance composites.

BACKGROUND OF THE INVENTION

Fiber-reinforced resin composites have gained an increasing market share for high performance parts used in various industries, as for example automotive and aircraft components. In the composite industry, continuous carbon and glass fibers are impregnated with polymeric resins, then wound or layered against rigid mold surfaces and cured into structural parts.

Two classes of resins are used in composites. A thermosetting resin reacts in the presence of heat or a catalyst to produce a 3-dimensional structure that cannot be reshaped. Epoxies and certain polyimides are examples of thermosetting resins used in composite technology. A thermoplastic resin retains its two-dimensional structure in the presence of heat and pressure. As a result, thermoplastic resins can be softened or melted many times, thus allowing for re-shaping. Polyether-etherketone (PEEK), ultra high molecular weight polyethylene (UHMWPE) and polybenzimidozole (PBI) are examples of high performance thermoplastics used in forming composites. In general, the art of forming high performance thermosetting resin composites is more advanced than the art of forming high performance thermoplastic composites.

A problem encountered in the preparation of fiber reinforced thermoplastic composites is that it is difficult to obtain good wetting of the reinforcing fibers or filaments, and consequently it is difficult to obtain composites in which air bubbles are absent at the interfaces between resin and reinforcing fiber. As a consequence, it is desirable to produce pre-pregs of fiber-reinforced resins in which the fibers constitute a relatively high percentage of the weight of the pre-preg and then incorporate this pre-preg into the resinous composite.

Various methods of coating fibers with the desired coating polymer are known. Basically, these are as follows:

1. Solution coating, i.e. dissolving the polymer in a solvent, coating the resulting solution onto a fiber tow, evaporating away the solvent, leaving the polymer as a coating on the fiber surface.

2. Suspension or emulsion coating, i.e. suspending or emulsifying a polymer powder in a non-solvent, coating the fiber tow with the resulting liquid suspension or emulsion, then evaporating the non-solvent carrier, leaving the polymer powder in intimate contact with the fibers. An additional thermal process step, to fuse the powder on to the fiber surface, is usually required.

3. Melt impregnation of a fiber tow with molten polymer.

4. Spinning processes, i.e., spinning a fiber of the polymer, weaving or commingling these fibers with the tow, then heating the fiber structure to melt the polymer fibers on to the adjacent reinforcing fibers.

Each one of these processes has one or more technical limitations. Solvents can be toxic or noxious, and in any case, are very difficult to remove from most high performance polymers. Solvents trapped in the final composite product can result in porosity and weak areas in the structure.

High polymer viscosity inhibits resin impregnation of the reinforcing fiber bundle with molten polymer.

Suspensions and emulsions usually require the addition of emulsifiers or suspending agents, which remain in the finished composite and which can adversely affect mechanical performance.

Commingling requires production of a polymeric fiber from the matrix material. This can be difficult to do and can be quite expensive.

Another coating process is electrostatic coating. Basically, charged particles of a desired coating agent are applied to the surface of a substrate which is either oppositely charged or grounded. While electrostatic coating techniques have been used to coat flat surfaces, e.g. sheets, and single rods or wires, only very recently (in 1989) has the use of dry powder coating techniques for coating of reinforcing fiber tows been reported in the literature.

Muzzy et al, in a publication, i.e. 34th International SAMPE Symposium, May 8-11, 1989, pages 1940-1951, describes preparation of thermoplastic tow pregs by electrostatic deposition of charged fluidized thermoplastic polymer particles directly from a fluidized bed on to a spread continuous carbon fiber tow. The tow, which is grounded, is passed through a fluidized bed of electrostatically charged polymer particles. The polymer particles are both electrostatically charged and fluidized by ionizing (or charging) a flowing air stream and then passing this air stream upwardly through a bed of polymer particles. The tow with particles deposited thereon is then heated in an oven to cause the polymer particles to melt and coat the tow fibers.

A disadvantage of the Muzzy et al process is that it works best with comparatively coarse polymer particles, e.g. those having average sizes of about 80 microns or larger, and does not work particularly well with finer particles. Better results in ionizing of air and charging of polymer particles are obtained at comparatively high air velocities than at lower air velocities. On the other hand, these comparatively high air velocities correspond to the fluidizing velocities of comparatively large particles (say about 80 microns or larger); the fluidizing velocities for particles approximately 5 to 10 microns in diameters i.e. in the same range as the fiber diameter, are well below those required for optimum air ionization and polymer particle charging.

Other electrostatic coating processes, such as the process shown and described in U.S. Pat. No. 4,084,109 to Christ et al, are also known.

U. S. Pat. No. 3,873,389 to Daniels describes a process and apparatus for pneumatically spreading thin carbon filaments from a tow bundle to form a sheet or tape in which the individual filaments are parallel. This is achieved by passing the tow continuously through a pair of slot venturi spreaders, with air flowing concurrently with the tow in the first and countercurrently to the tow in the second. The spread tow may then be continuously passed through a bath of impregnating material, which is usually a plastic resin of the epoxy, phenolic or polyimide type.

Cross, in *Chemistry in Britain*, Vol. 17, no. 1, pages 24–26, (1981), discloses several electrostatic powder coating processes for depositing dry charged paint, resin or pigment particles onto a grounded workpiece. In one embodiment (FIG. 1), fluidized powder particles are drawn into an electrostatic gun in which the particles are charged. The charged particles are sprayed onto the grounded workpiece.

DISCLOSURE OF THE INVENTION

This invention provides a process for coating a fiber tow with a thermoplastic polymer, which process comprises:
(a) spreading a fiber tow of continuously moving, long continuous fibers;
(b) forming a particle-laden air stream by introducing uncharged thermoplastic resin polymer particles from a fluidized bed into a flowing air stream;
(c) electrostatically charging the particles in said particle-laden air stream;
(d) depositing the charged polymer particles from said air stream on to the spread tow of continuously moving long continuous fibers formed in step (a), wherein said charged particles have a mean particle size in the range of about 0.1 to about 40 microns, said fibers are of essentially uniform diameter in the range of about 5 to about 50 microns and the ratio of mean particle size to fiber diameter is in the range of about 0.1 to about 10;
(e) heating the fibers with adhering particles to a temperature sufficiently high to fuse said particles of thermoplastic polymer and thereby form a coating of said thermoplastic polymer on said fibers, and
(f) winding up the coated fibers.

The mean particle size of the charged polymer particles is preferably no greater than the fiber diameter.

BRIEF DESCRIPTION OF THE DRAWINGS IN THE DRAWINGS:

FIG. 3 is a schematic elevational view, shown partly in section, of a preferred apparatus for forming an airborne stream of electrostatically charged polymer powder particles.

BEST MODE FOR CARRYING OUT THE INVENTION

Figure 1:
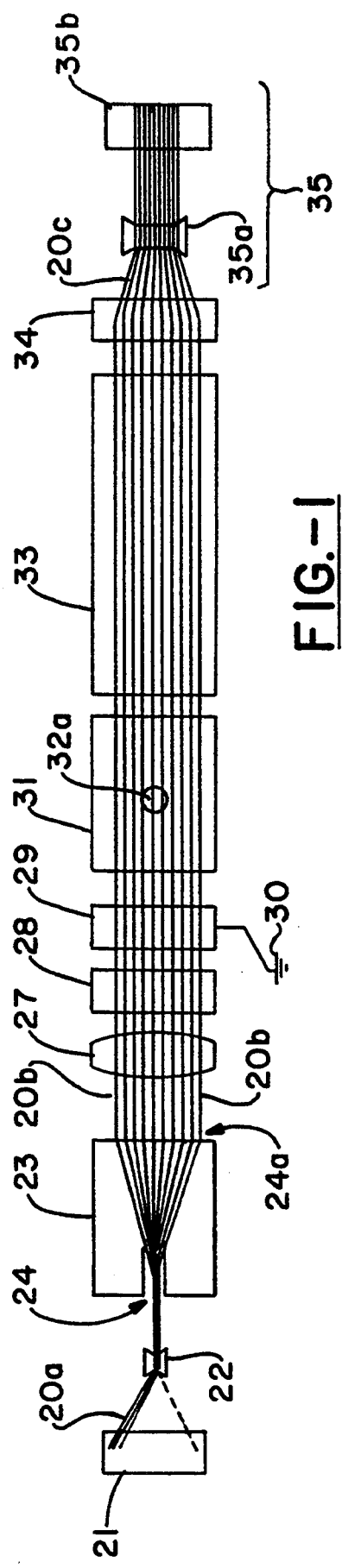
FIG. 1 is a schematic plan view of a preferred processing line used in the practice of this invention.

This invention will now be described in detail with respect to the best mode and preferred embodiment thereof, as particularly shown in the accompanying drawings.

The fiber or filament which is treated according to this invention in the form of a tow, typically containing from 3,000 to 12,000 (3K to 12K) fibers of essentially uniform diameter, wound around a spool. The mean fiber diameter may be in the range of about 5 to about 50 microns, preferably from 5 to about 20 microns. The fibers are long continuous fibers. The phrase "of essentially uniform diameter" denotes that all or nearly all the fibers have a fiber diameter within ±20 percent of the mean fiber diameter, and usually within ±10 percent of the mean fiber diameter.

Any fiber which is suitable for plastics reinforcement and which is capable of holding an electrostatic charge may be used. Suitable fibers include carbon, glass, aromatic polyamide (e.g. aramide, which is sold under the trademark "Kevlar"), aromatic polyimide, ceramic and metal. Preferred fibers for the purpose of this invention are carbon and glass. Carbon is especially preferred. Typically, fiber diameters are 5 to 50 microns.

The thermoplastic coating material is preferably a high performance thermoplastic resin such as polyether-ether ketone (PEEK), ultra-high molecular weight polyethylene (UHMWPE), thermoplastic polyimide (TPI) or polybenzimidazole (PBI). Other high performance thermoplastics are known and may be used as coating materials. Plastic coating material must be one which does not deleteriously affect the properties of the fiber-reinforced composite into which the coated fibers of the present invention are incorporated. Thus, when the desired end product composite must have good high temperature performance, a high performance thermoplastic must be used as a coating material. While the term, "high performance thermoplastic" has no precise definition, it is widely used and the polymers which the term embraces are generally understood and agreed upon. Most high performance polymers have melting points or glass transition temperatures in excess of 200° C. An exception is UHMWPE, which has a melting point of 130° C. and is considered a high performance polymer. However, UHMWPE has very high abrasion resistance and impact toughness. More common thermoplastic polymers which are not high performance polymers, may be used for coating where their presence in the desired end use reinforced composite is acceptable.

Electrically charged particles of coating polymer are deposited on the surfaces of continuously moving fibers forming a tow in the process of this invention. The coating polymer particles are generally in the range of about 0.1 to about 40 microns. These values represent mean particle diameters. Preferred mean particle diameter is in the range of about 5 to about 20 microns. Generally the mean particle diameter will be no more than 10 times the mean fiber diameter nor less than 0.1 times the mean fiber diameter; the ratio of mean particle diameter to mean fiber diameter is preferably not greater than 1.0. Generally there is a particle size distribution among the coating particles. It is preferred that the largest coating particles be no more than about 5 times the mean fiber diameter.

Additional solid or liquid materials, such as binders are neither necessary nor desirable. Rather, sufficient adhesion of coating particles to fibers is attained when both are in the dry state at the time of deposition.

The process of this invention will be described with particular reference to the drawings.

Figure 2:
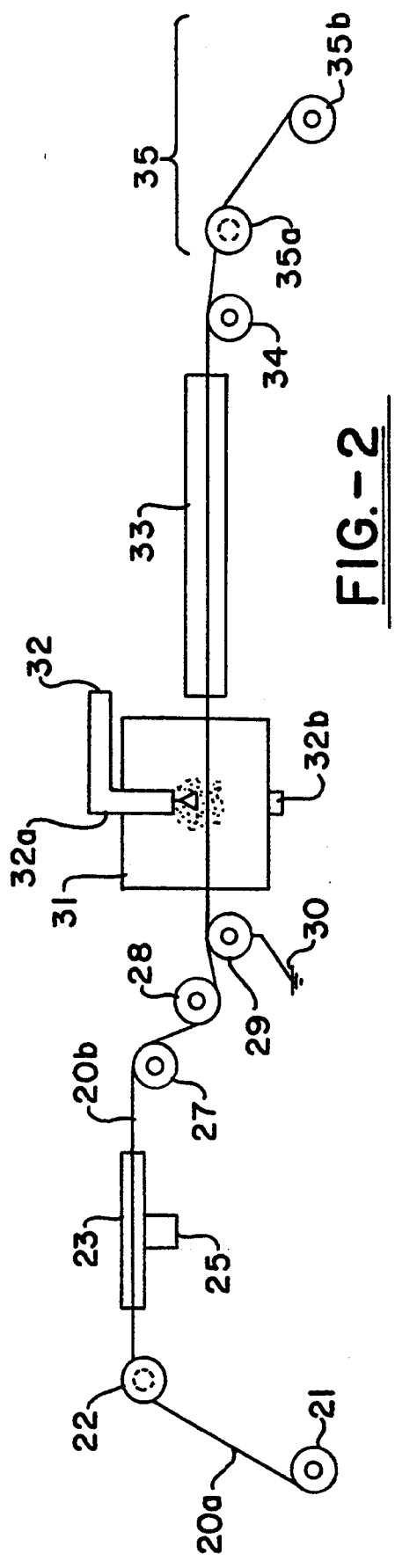
FIG. 2 is a schematic front elevational view of the processing line shown in FIG. 1.

Referring now to FIGS. 1 and 2, a fiber bundle or tow 20a, typically consisting of 3,000 to 12,000 fibers having a mean fiber diameter of about 5 to about 50 microns, is unwound from take-off spool 21 at a constant speed, and centered by means of a centering pulley 22. This centering pulley is V-shaped to allow for tow feed from the edges of the spool. Frictional drag of the tow over the pulley surface causes the pulley to rotate. The pulley shaft is supported by air bearings.

The tow then passes continuously through a pneumatic fiber spreader 23, where the tow is pneumatically spread laterally to a width suitable for subsequent deposition of thermoplastic coating particles thereon. The fiber spreader may be as described in C. Kim and R. A. Gray, "Development of Fiber Spreading Technique for Metal Matrix Composites", NRL Memorandum Report 5831, Dec. 30, 1986, *Naval Research Laboratories*, Washington, D.C. Fiber spreader 23 operates at substantially atmospheric pressure, which as used herein, includes slight superatmospheric and slight subatmospheric pressures. Preferably, spreader 23 is operated at a very slight subatmospheric pressure, of about 5 inches of water. Air streams 24 and 24a enter the fiber entrance and fiber exit ends, respectively, of spreader 23. Spreader 23 includes a pair of spaced aligned spreader elements (not shown) of rectangular cross section and slot-like dimensions (i.e. much wider than high) through which the fiber tow passes. Adjustable flow restrictors associated with each of these elements (typically at the tow entrance end of the first and at the tow exit end of the second) give a venturi effect. Laminar air flow through these elements, concurrent in the first and countercurrent in the second, causes the tow to spread laterally. Air is discharged from spreader 23 through a common air outlet port 25. A pump or fan (not shown) is provided in order to exhaust air from subatmospheric pressure in the spreader 23 to the atmosphere. It is possible to omit air stream 24 and the first of the two spreader elements, and thereby rely on countercurrent air flow alone to spread the tow. Good results are obtained in either case. It is also possible to omit the flow restrictor associated with the spreader element and instead rely on pressure control in the air outlet port 25 in order to obtain desired operating conditions.

Another suitable fiber tow spreader, which operates on the same general principle, is that shown in U.S. Pat. No. 3,873,389 to Daniels cited supra.

The spread tow 20b is then passed over a convexly curved (i.e. barrel shaped) polyethylene roll 27, then under a tension type flat (or cylindrical) polyethylene roll 28, then over a metal roll 29. The metal roll 29 is grounded by means of ground 30. Rolls 27, 28 and 29 are supported on air bearings.

The degree of spread of tow 20b at the time of particle deposition thereon is not critical, but must be sufficient so that substantially all fiber surfaces are exposed and therefore available for particle deposition. In the illustrated embodiment, the average number of rows of fibers in the thickness direction (which is perpendicular to both the fiber axes and the width direction) is approximately 2.5, based on a 12K tow, a fiber diameter of 5 to 20 microns, and a tow spread width of correspondingly 25 to 100 mm.

The spread and grounded tow then passes into an enclosed dust box 31. This dust box has slotted openings at either end for the entrance and exit of the continuously moving tow. Inside dust box 31, electrostatically charged polymer particles are deposited onto the fibers of the grounded continuously moving spread tow from a particle-laden air stream which is formed in an electrostatic powder sprayer 50 and introduced into dust box 31 via inlet 32a. In any case, the electrostatically charged polymer particles and the fibers must be at different electrical potentials at the time of contact between the polymer particles and the spread tow.

Sprayer 50 will be described hereinafter with respect to FIG. 3. A suitable electrostatic powder sprayer, (and the one actually used in the work described in the examples herein) is a Ransburg-GEMA Model 701 sprayer, distributed by Ransburg Corp., Indianapolis, Ind., USA. This particle-laden air stream in dust box 31 passes downwardly through the horizontally moving spread fiber tow 20b in the thickness direction, so that the polymer particles contact the fibers in the tow and are deposited thereon. Both the fibers and the particles are essentially dry. A small portion of the particles are not so deposited, and these are collected via outlet 32b and recycled. Dust box 31 is preferably operated under a slight negative pressure (e.g. on the order of 5 inches of water) in order to minimize dusting. This contains most of the polymer particles within the box.

Referring now to FIG. 3, sprayer 50 comprises an aspirator unit 52, in which an airborne stream of uncharged polymer particles is formed, an electrostatic gun 54, in which the polymer particles are electrostatically charged and then discharged on to moving fiber tow 20b, and an electrostatic control module 56, and a pneumatic unit (not shown) which is the source of compressed air for the aspirator unit 52.

Aspirator unit 52 includes an injector 60, in which a polymer particle-laden air stream (or powder/air mixture) is formed. The structure of injector 60 may be conventional. Injector 60 comprises a longitudinal bore 62 having a nozzle 64 therein, a first transverse passageway or inlet port 66 for dosing air (or secondary air), and a second transverse passageway or aspiration hole 68 for polymer particles and fluidizing air. Longitudinal bores 62 serves both as the primary air (also known as conveying air or carrier air) and as the outlet for the particle-laden air stream (or powder/air mixture). (The finely divided polymer particles may be referred to as a powder, and this term will be used herein). Dosing air inlet port 66 intersects bore 62 in an annular zone surrounding nozzle 64. Aspiration hole 68, which is typically conical (the larger end being the inlet end) intersects bore 62 immediately downstream of nozzle 64. A fitting 70 for an outlet hose connection may be inserted into the outlet end of bore 62. Additional fittings (not numbered) for hose connections may be provided in the inlet end of bore 62 and in secondary air passageway 66.

Aspirator unit 52 also includes a hopper 72 for fluidized polymer particles, a first hose 74 for conveying air and fluidized particles from hopper 72, a second hose 76 for primary air, a third hose 78 for secondary or dosing air, and an outlet hose 80 for conveying the particle-laden air stream from injector 62 to electrostatic gun 54. Hopper 72 contains a fluidizing air inlet (not shown) and a perforated plate near the bottom thereof. Hose lines 76 and 78 for primary air and dosing air, respectively, may contain manometers (unnumbered) for measuring air pressure and check valves (unnumbered) for preventing reverse air flow.

Electrostatic gun 54 includes an inlet 82, and a hollow barrel 84 having associated therewith a high voltage transformer 86, a high voltage cascade 88, and electrode means 90. Preferred electrode means include a central electrode in the form of a wire which is charged to the desired potential, and a grounded gun barrel. Polymer particles are charged by passing between the charged electrode and the gun barrel. Current is stepped up by the high voltage transformer and the high voltage cascade from line voltage to a high voltage, such as 70 or 100 kV. Any voltage of 20 kV or more is suitable. Conical spreader 92 at the discharge end of gun 54 distributes the polymer particles in a circular or oval pattern, depending on the cross-sectional shape of the spreader, over the width of the fiber tow.

The entire electrostatic sprayer 52 may be of any desired size and may be either stationary or portable. In the latter case, the sprayer may be mounted on a frame (not shown) which is on rollers.

The powder (or polymer particles) in hopper 72 is fluidized by air flowing upwardly through hopper 72. This air passes through a perforated plate near the bottom of the hopper, and then upwardly through the bed of powder in hopper 72. These uncharged fluidized polymer particles are introduced into the air stream flowing through jet 60 by aspiration. Flow of primary air through hose 76 and nozzle 64 creates a partial vacuum just downstream of the nozzle, drawing polymer particles (or powder) into the air stream and forming an air stream with polymer particles suspended therein. Both the velocity of the particle laden air stream through hose 80 and electrostatic gun 54, and the powder flow rate through the hose and gun, can be controlled by controlling the pressure (and therefore the velocity) of primary air. The velocity of this particle laden air stream should always be in excess of the settling velocity or terminal velocity of the polymer particles. The powder dosage rate can be reduced while maintaining a given air stream velocity by increasing the flow of dosage air through hose line 78. Increase in dosing air rate decreases the partial vacuum inside injector 60, reducing the rate of particle polymer aspiration. The polymer particles become electrostatically charged in gun 54. The charged polymer particles are deposited onto continuously moving fiber tow 20b in either a circular or oval pattern across the entire width of the fiber tow. The electrostatically charged particles are deposited around the entire circumference of the grounded (and therefore uncharged) fibers and cling thereto by reason of the difference in electrical charge between the polymer particles and the fibers. Only a small fraction of the polymer particles fail to attach themselves to fibers, and these can be recovered as previously described and returned to hopper 72.

The powder flow rate is controlled in order to obtain desired polymer weight in the product. The preferred products contain from about 30 to 50 percent by weight of polymer and conversely from about 50 to about 70 percent by weight of fiber.

The spread tow, having coating particles adhering to the fibers, continuously passes from the dust box 31 into a radiation/convection oven 33, where the polymer particles and the fibers are heated to a temperature sufficient to cause the polymer particles to fuse and thereby form thin coatings on the fibers. The heating temperature in this oven must be sufficient to cause fusion of the polymer and is typically just above the melting point or the glass transition temperature, as the case may be, of the coating polymer.

The tow of polymer-coated fibers, which is called a tow-preg, continuously exits oven 33 and is passed successively over a second flat polyethylene centering roll 34, supported on air bearings, and then on to a take-up re-spooling system 35 which comprises a rotating idler roll 35a having a cylindrical center portion and outwardly flared frustoconical side portions, and a cylindrical take-up spool 35b. It will be noted that the tow is narrowed laterally by the idler spool 35a and this narrowed tow 20c is wound up on spool 35b. The wound up or re-spooled tow is typically about 10 to 20 mm wide although this width is not critical.

Fiber constitutes from about 20 to 90 percent by weight and coating polymer conversely from about 80 to about 10 percent by weight of a coated fiber tow product or tow-preg according to this invention. Preferably, fiber constitutes about 50 percent to about 70 percent of the total weight of the tow-preg. Conversely, polymer preferably constitutes about 30 percent to about 50 percent by weight of the tow preg. Most preferably, fiber constitutes about 60–65 percent and conversely polymer constitutes about 35–40 percent of the total weight of the tow preg.

Tow-pregs prepared according to the present invention are nearly as flexible and have nearly as good a hand as the uncoated fibers. This is in contrast to tow-pregs prepared according to methods presently known in the art, which tend to be stiff. At the same time, the coatings in tow-pregs of this invention are continuous and therefore fully compatible with the matrix polymer of the end use composite into which the tow-preg (or pre-preg) herein is incorporated. The increased flexibility of pre-pregs herein, compared to those of the prior art, greatly facilitates preparation of the end use composites. Tow-pregs prepared according to the present invention are sufficiently flexible to be suitable for weaving applications.

This invention will now be described with reference to the examples which follow:

EXAMPLE

Materials

The materials used herein are as follows:

Carbon fiber—5 kg AS-4, 12K tow, (12,000 individual fibers) obtained from Hercules, Inc., Wilmington, Del. This material has a mean fiber diameter of 7 microns.

Coating polymer—LaRC-TPI 1500, which is a thermoplastic polyimide obtained from Mitsui Toatsu Chemicals, Inc. of Japan. The composition of this polymer is more fully described in U.S. Pat. No. 4,543,295. This material as received has a particle size range from about 0.1 to about 8 microns, with a mean particle size of about 5.6 microns. The as-received material is dried prior to use. This material has a nominal melting point, as shown by DSC, of 280° C.

Equipment

Equipment used in this example is as follows:

Fiber tow spreader substantially as described in C. Kim and R. A. Gray "Development of Fiber Spreading Technique for Metal Matrix Composites", NRL Memorandum Report 5831, Naval Research Laboratories, Washington, D.C., Dec. 30, 1986.

Electrostatic sprayer: Ransburg-GEMA Model 701 as previously described.

Oven: Lindberg Radiation/Convection Oven, Model No. 55346, manufactured by General Signal Corp., Stamford, Conn.

Process

The process scheme in this example follows that shown in FIGS. 1 and 2 of the drawings.

The carbon fiber tow is continuously unwound from spool 21 at a linear velocity of 0.7 m/min. This fiber tow is spread in the spreader to a width of 35–50 mm. The spread tow passes successively over a spread roll, tension roll and metal ground roll, all as shown in the drawings. Then the spread tow enters the dust box, which is maintained at a temperature of about 25° C. and a pressure of atmospheric or subatmospheric to about 5 inches water column.

The electrostatic charge level is 40 kilovolts (kV). Dosage air is one unit and carrier air is dust less than 10 units, both on a scale of 1 to 10. This corresponds to a very low flow rate of aspirated polymer powder to the electrostatic gun. The aspiration rate is measured by weight loss at about 0.4 g/min. The fiber residence time in the dust box is about 20 seconds. The cone of powder-laden air is about 75 mm. in diameter at the point of contact with the spread tow. The larger end of the cone is approximately 150 mm. above the plane of the spread tow. The fibers with electrostatically charged particles clinging thereto exit the dust box and are passed into a radiation/convection oven. The oven temperature is about 350° C. This causes the thermoplastic polymer particles to melt and to form continuous coherent coatings on the fibers. The coated fibers, or tow pre-pregs, are wound up at 2.5 rpm (this corresponds to the linear speed of 0.7 meters per minute). The total running time for the run described in this example is 10 minutes. (The duration of a run is not important since steady state conditions prevail throughout most of a run).

The tow pre-preg consists of 61.5% by weight of carbon fiber and 38.5% of coating polymer by weight.

While this invention has been described in detail with reference to a specific embodiment thereof, it shall be understood that such description is by way of illustration and not limitation.

What is claimed is:

1. A process for coating a fiber tow with a thermoplastic resin polymer which comprises:
   (a) pneumatically spreading a fiber tow of long continuous fibers and electrically grounding said fibers;
   (b) forming a particle-laden air stream by introducing uncharged thermoplastic resin polymer particles from a fluidized bed into a flowing air stream which is at a velocity in excess of the settling velocity of said particles;
   (c) electrostatically charging the particles in said particle-laden air stream;
   (d) depositing the charged polymer particles from said air stream on to the spread tow of long continuous fibers formed in step (a), wherein said charged particles have a mean particle size in the range of about 0.1 to about 40 microns, said fibers are dry, uncoated and uncharged and of essentially uniform diameter in the range of about 5 to about 50 microns and the ratio of mean particle size to fiber diameter is in the range of about 0.1 to about 10;
   (e) heating the fibers with adhering particles to a temperature sufficiently high to fuse said particles of thermoplastic polymer and thereby form a coating of said thermoplastic polymer on said fibers; and
   (f) winding up the coated fibers.

2. A process according to claim 1 wherein said fibers are continuously moving.

3. A process according to claim 1 wherein the diameter of said fibers is in the range of about 5 to about 50 microns.

4. A process according to claim 1 wherein said fibers are carbon fibers.

5. A process according to claim 1 wherein said fibers are glass fibers.

6. A process according to claim 1 wherein said thermoplastic polymer is a high performance thermoplastic polymer having a melting point above about 100° C.

7. A process according to claim 6 wherein said thermoplastic polymer is selected from the group consisting of polyether-ether ketone (PEEK), ultrahigh molecular weight polyethylene (UHMWPE) thermoplastic polyimide (TPI) and polybenzimidazole (PBI).

8. A process according to claim 1 wherein said flowing air stream and the particles suspended therein are flowing downwardly and are conically spread outwardly at the time of contact with said fiber tow.

9. A process according to claim 1 wherein substantially all of the charged particles are of a diameter not greater than about 5 times the mean fiber diameter.

10. A process according to claim 1 wherein said fibers constitute about 20% to about 90% of the total coated fiber composition weight.

11. A process according to claim 1 wherein the ratio of mean particle diameter to mean fiber diameter is from about 0.5 to about 1.5.

12. A process according to claim 1 wherein the polymer particles in said air stream are continuously charged by passing through an electrostatic potential of at least abut 20 kV.

13. A process according to claim 1 wherein the mean particle diameter is from about 5 to about 20 microns.

14. A process according to claim 1 wherein the mean fiber diameter is from about 5 to about 20 microns.

15. A process according to claim 1 wherein the ratio of mean particle diameter to mean fiber diameter is not greater than about 1.0.

* * * * *